United States Patent
Shea

(10) Patent No.: US 10,926,969 B1
(45) Date of Patent: Feb. 23, 2021

(54) ROLLER ARM ASSEMBLY FOR TEMPORARY TAPE REMOVAL MACHINE

(71) Applicant: James P. Shea, Waterford, MI (US)

(72) Inventor: James P. Shea, Waterford, MI (US)

( * ) Notice: Subject to any disclaimer, the term of this patent is extended or adjusted under 35 U.S.C. 154(b) by 0 days.

(21) Appl. No.: 16/893,691

(22) Filed: Jun. 5, 2020

(51) Int. Cl.
| | | |
|---|---|---|
| *B23B 43/00* | (2006.01) |
| *B62D 63/04* | (2006.01) |
| *B65H 18/02* | (2006.01) |
| *B65H 18/10* | (2006.01) |
| *B65H 19/22* | (2006.01) |
| *B32B 43/00* | (2006.01) |
| *F16M 11/12* | (2006.01) |

(52) U.S. Cl.
CPC ........... *B65H 18/10* (2013.01); *B32B 43/006* (2013.01); *B65H 19/2292* (2013.01); *B65H 18/026* (2013.01); *B65H 2403/93* (2013.01); *B65H 2701/1922* (2013.01); *F16M 11/121* (2013.01)

(58) Field of Classification Search
CPC ................ B65H 18/028; B65H 18/026; Y10T 156/1174; Y10T 156/195; F16M 11/121
See application file for complete search history.

(56) References Cited

U.S. PATENT DOCUMENTS

| | | | | |
|---|---|---|---|---|
| 4,037,395 A * | 7/1977 | Henkensiefken | .... | A01D 67/005 56/218 |
| 4,584,826 A * | 4/1986 | Bettencourt | ......... | A01D 67/00 56/10.2 R |
| 4,838,358 A * | 6/1989 | Freudendahl | ......... | A01B 59/04 172/125 |
| 4,919,358 A * | 4/1990 | Innocenti, Sr. | ........ | B65H 75/10 242/610.5 |
| 5,076,042 A * | 12/1991 | Koorn | .................. | A01D 34/661 56/13.8 |
| 5,114,268 A * | 5/1992 | Marcato | .................. | E01C 23/22 404/101 |
| 5,544,475 A * | 8/1996 | Skibo | .................... | A01D 67/005 56/15.5 |
| 6,413,012 B1 * | 7/2002 | Jones | ..................... | E01C 23/166 239/150 |
| 6,625,964 B2 * | 9/2003 | McLeod | ............... | A01B 59/042 172/677 |
| 6,830,211 B2 * | 12/2004 | Sloan | .................... | B65H 75/242 242/573.1 |
| 9,062,435 B2 * | 6/2015 | Hylen | ..................... | B66C 23/90 |
| 10,112,794 B1 * | 10/2018 | Shea | ....................... | E01C 23/06 |
| 2002/0092941 A1 * | 7/2002 | Henderson | .............. | A47J 42/50 241/169.1 |
| 2017/0000027 A1 * | 1/2017 | Hunt | ...................... | A01D 46/30 |
| 2017/0312777 A1 * | 11/2017 | Fontaine | .............. | B05B 12/002 |

* cited by examiner

*Primary Examiner* — Mark A Osele

(57) ABSTRACT

A roller arm assembly for a temporary tape removal machines which roller assembly supports a spool assembly on a vehicle that removes temporary tape from a pavement surface. The roller assembly is attached to a chassis or frame of the vehicle and is pivotal between a raised and lowered position. The roller assembly includes a lower arm member and an upper arm member which are rotatably coupled together. The upper arm member supports a spool assembly and a hydraulic motor that rotates the spool assembly. The upper arm of the roller assembly can be rotated with respect to the lower arm to allow the spool assembly to be position on either side of the vehicle chassis or frame.

17 Claims, 7 Drawing Sheets

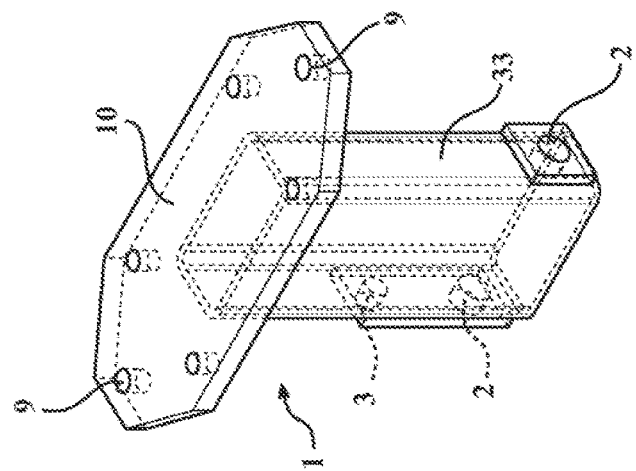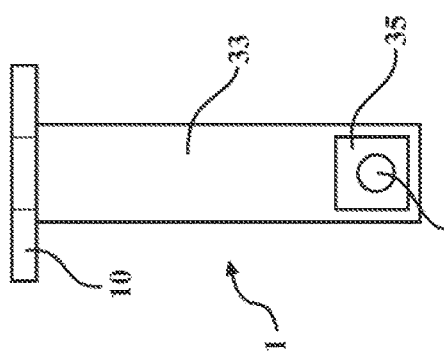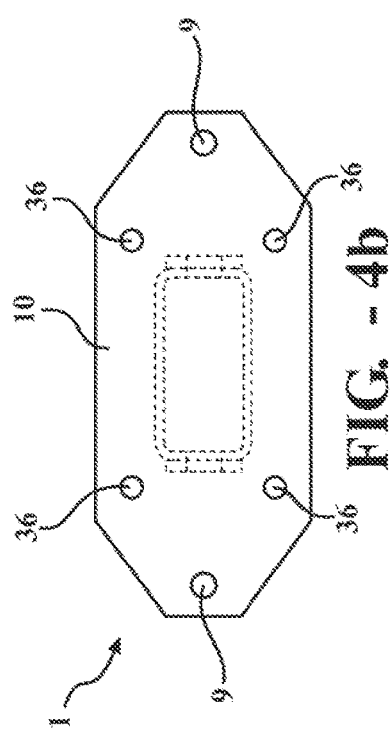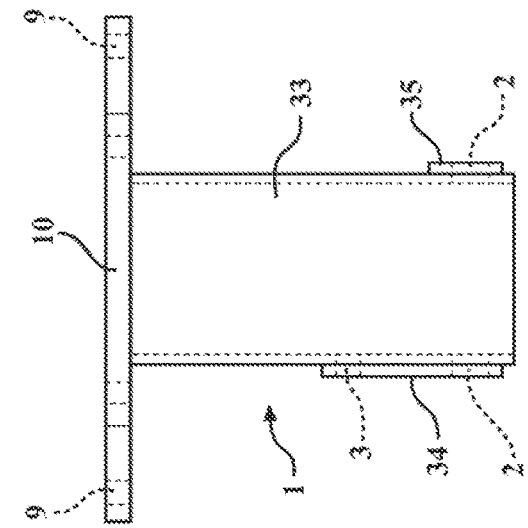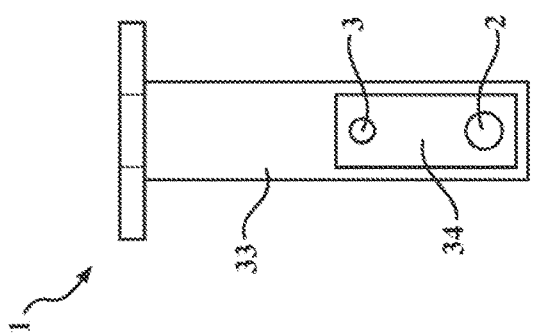

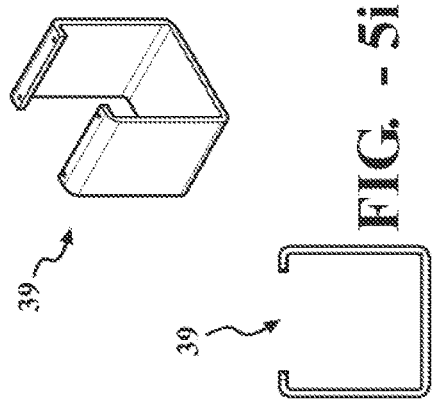
FIG. - 5f
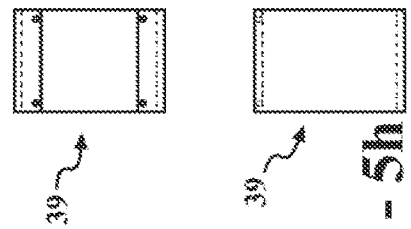
FIG. - 5g
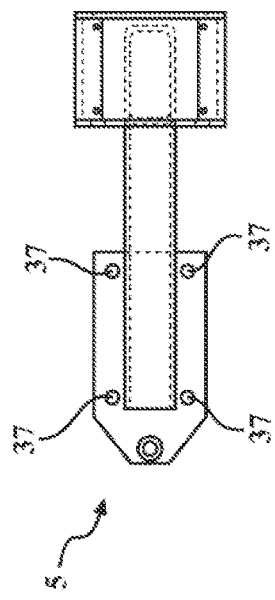
FIG. - 5b
FIG. - 5i
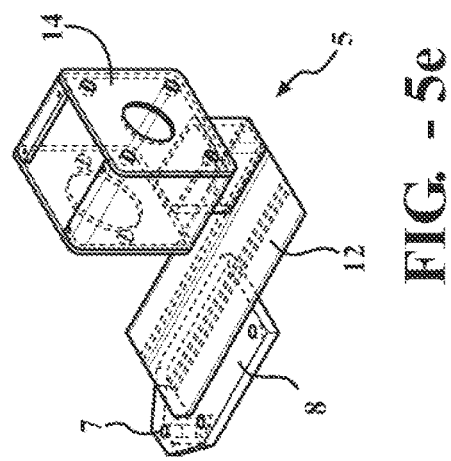
FIG. - 5e
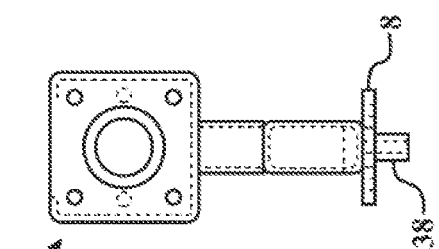
FIG. - 5h
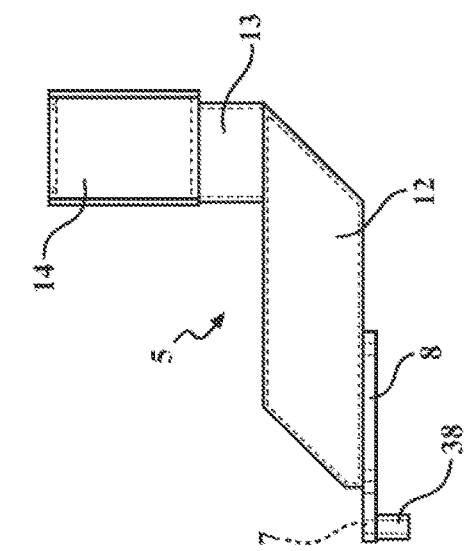
FIG. - 5d
FIG. - 5a
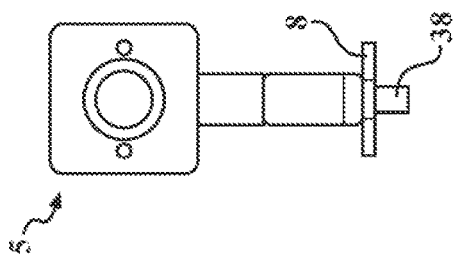
FIG. - 5c

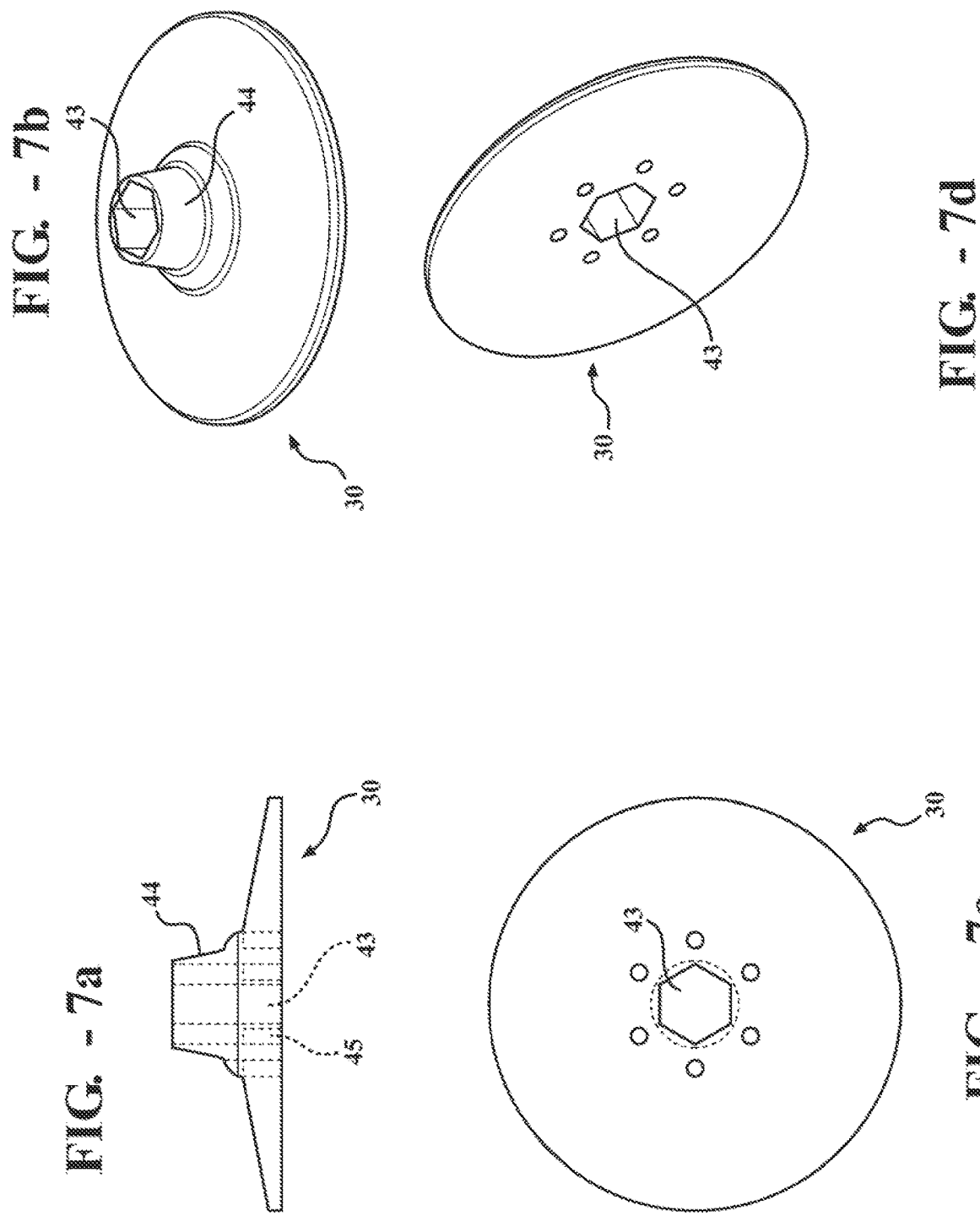

ROLLER ARM ASSEMBLY FOR TEMPORARY TAPE REMOVAL MACHINE

BACKGROUND

The present invention relates generally to machines that are designed to remove temporary marking tapes from roads, airport runways, parking lots, bicycle paths and other paved surfaces. More particularly the present invention relates to a roller arm assembly for such machines.

The present inventor was granted U.S. Pat. No. 10,112, 794 on Oct. 30, 2018 which disclose a Motorized Tape Removal Apparatus (MTRA) that is designed and constructed to safely remove and handle temporary lane marking tape has been removed in a manner that reduces the amount of labor and time it has taken in the past to remove and handle the tape.

U.S. Pat. No. 10,112,794 discloses that the MTRA includes a boom arm that extends outward from the chassis of the MTRA and is movable between up and down and side to side positions relative to the chassis, The upper end of the boom arm supports a spool assembly that includes a rotatable spool upon which used temporary tape removed from a pavement surface is wound for disposal.

The present invention provides an improved boom arm (herein referred to as a roller arm assembly) for an MTRA that allows for easily locating the spool assembly on either side of the MTRA or in a forward position for transportation.

BRIEF SUMMARY

According to various features, characteristics and embodiments of the present invention which will become apparent as the description thereof proceeds, the present invention provides a vehicle for removing temporary tape that comprises a chassis having fixed and guiding wheels, a spool assembly including a rotatable spool assembly for winding used temporary tape thereon, a spool assembly support mounted to the chassis and supporting the spool assembly above the chassis, and controllable drive means to rotate the rotatable spool, the improvement wherein the spool assembly support comprises:

a lower arm portion attached to the chassis; and an upper arm portion rotatably attached to a top of the lower arm portion, said spool assembly coupled to the top of the upper arm assembly, wherein the upper arm portion is configured to allow the spool assembly to be positioned on either side of the chassis when the upper arm is rotated with respect to the lower arm portion.

BRIEF DESCRIPTION OF THE DRAWINGS

The present invention will be described with reference to the attached drawings which are given as non-limiting examples only, in which:

FIGS. 4a-4e are perspective, top, front, and side views of the spool lower weldment according to one embodiment of the present invention.

FIGS. 5a-5e are perspective, top, front, and side views of the spool upper weldment according to one embodiment of the present invention.

FIGS. 5f-5i are perspective, top, front, and side views of the top enclosure of the spool upper weldment according to one embodiment of the present invention.

FIGS. 7a-7d are cross-sectional, perspective top, perspective side and side views of the spool outer plate according to one embodiment of the present invention.

DETAILED DESCRIPTION OF THE DRAWINGS AND THE PRESENTLY PREFERRED EMBODIMENTS

Figure 2:
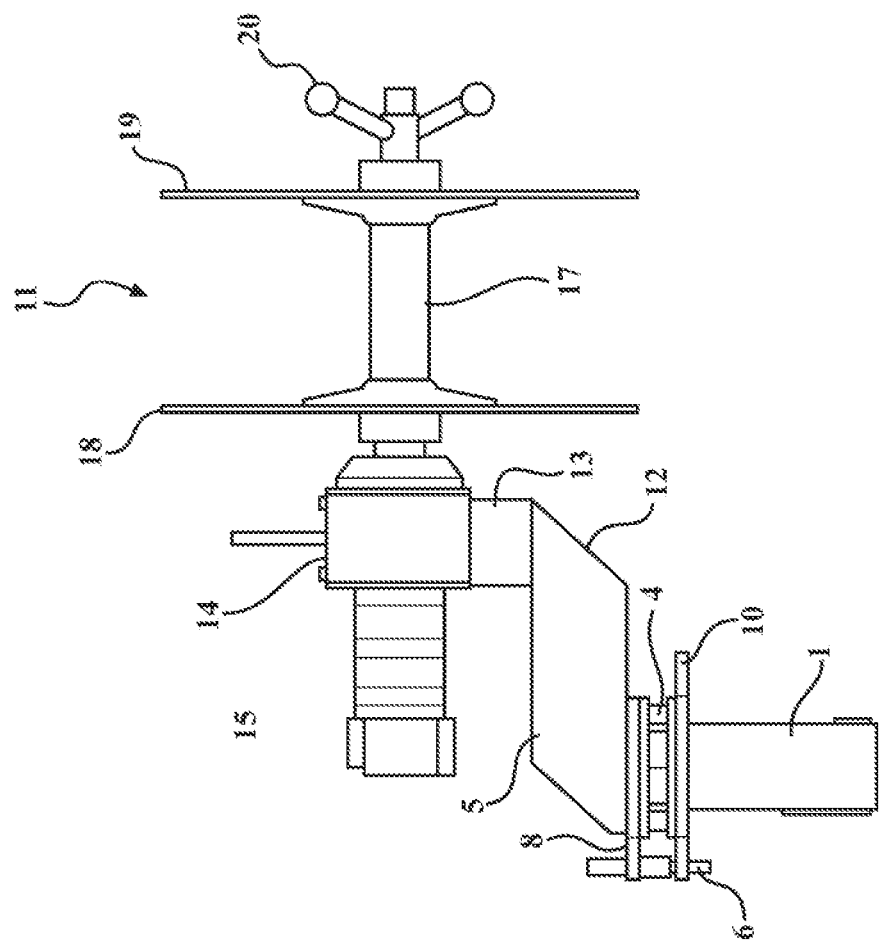
FIG. 2 is a front view of the roller arm assembly of FIG. 1.

The present invention provides an improved boom arm or roller arm assembly for an MTRA that allows for easily locating the spool assembly on either side of the MTRA or in a forward position for transportation. The roller arm assembly includes a spool lower weldment that is pivotally attached to a bracket at the front of the MTRA so as to be held in an upright position for transportation and a lower position that angles outward and upward from the attachment bracket. The attachment bracket includes a fixed pin that passes through a bore that extends through the sides of the spool lower weldment so that the spool lower weldment is the allowed to pivot about the fixed pin between the upright and lower positions. A spring biased locking pin passes through a bore in the side of the attachment bracket and into a bore in an adjacent side of the bottom of the spool lower weldment so that when these bores are aligned and the spring biased pin is released the spool lower weldment will be held in the upright position. If desired, a second bore can be provided in the adjacent side of the bottom of the spool lower weldment so that the spring biased pin can be used to locked in the lower position.

The spool lower weldment supports the roller arm assembly on the MTRA. A spool upper weldment is provided that is attached to the top of the spool lower weldment by a turn table. The turn table allows the spool upper weldment to rotate with respect to the spool lower weldment. As discussed below the spool upper weldment supports the spool assembly and a hydraulic motor that rotates the spool assembly. Thus, being able to rotate the spool upper weldment with respect to the spool lower weldment via the turn table, allows the spool assembly to be moved between either side of the MTRA for use, or in front of the MTRA for transportation.

The top of the spool lower weldment includes a flat plate to which the bottom of the turn table is attached. The flat plate is generally rectangular in shape with triangular ear portions extending from the sides and optionally from the front. These triangular ear extensions are provided with through bores that are configured to receive a locking pin.

The bottom of the spool upper weldment also includes a flat plate to which the top of the turn table is attached. The flat plate of the spool upper weldment includes a single triangular extension on an inner side (opposite from which side the spool assembly extends) which has a through bore therein. When the single through bore in the flat plate of the spool upper weldment is aligned with any of the through bores in the flat plate of the spool lower weldment a locking pin can be inserted into the aligned through bores to secure the spool assemble on either side of the MTRA for use or in front of the MTRA for transportation. Here it is noted that the flat plate of the spool lower weldment and the flat plate of the spool upper weldment can each have other shapes as long as they have the through bores that are alignable so as to receive a locking pin to secure the spool assemble on either side of the MTRA for use or in front of the MTRA for transportation.

The spool upper weldment has a lower horizontal portion that has a sufficient length to position the spool assembly off to either side of the MTRA so as to aligned with a length of temporary tape to be removed and wound on the spool assembly. The spool upper weldment includes a shorter vertical portion at the end of the lower horizontal portion that supports a coupler body that supports and couples a hydraulic drive motor to a spool drive shaft of the spool assembly, As used herein "roller arm assembly" encompasses each of the spool weldment assembly (spool lower weldment and spool upper weldment), spool assembly and hydraulic motor that drives the spool assembly. Further, as used herein the term "weldment" is intended to include, but not be limited to metal structures that are fabricated by a welding process or operation. The spool lower weldment is also referred to herein as the lower arm portion of the roller assembly and the spool upper weldment is referred to herein as the upper arm portion of the roller assembly. The combination of the spool lower weldment and the spool upper weldment is referred to herein as a spool assembly support.

Figure 1:
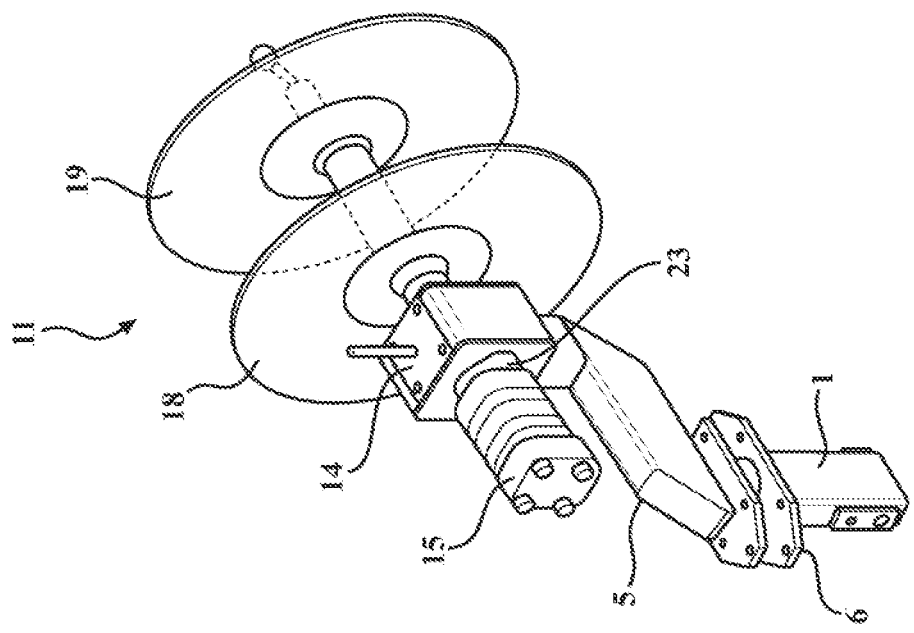
FIG. 1 is a perspective view of a roller arm assembly according to the present invention.

FIG. 1 is a perspective view of a roller arm assembly according to the present invention. FIG. 2 is a front view of the roller arm assembly of FIG. 1.

As discussed in reference to FIGS. 4a-4e below, at the bottom of the spool lower weldment 1, a through bore 2 is provided which extends through both sides of the spool lower weldment 1. This through bore 2 is configured to allow the spool lower weldment 1 to pivot about a pin provided in a roller arm assembly mounting or attachment bracket provided on the front of an MTRA. Such a mounting or attachment bracket can be a simple U-shaped bracket having a base attached to the MTRA and ear portions that extend from the base and are spaced apart to receive the bottom of the spool lower weldment therebetween. Another through bore is 3 provided in the side of the spool lower weldment 1 and is configured to receive a spring biased locking pin that extends from a side of the mounting or attachment bracket. As discussed herein, the spring biased locking pin can be manually pulled out to allow the roller arm assembly 1 to be positioned upright in a transportation position or lowered into a position to remove used temporary tape from a pavement surface.

As shown in FIGS. 1 and 2, a turn table 4 is provided between and secured to each of the spool lower weldment 1 and the spool upper weldment 5. In FIGS. 1 and 2 a locking pin 6 is depicted as extending through a through bore 7 provided in a flat plate 8 at the bottom of the spool upper weldment 5 and through a through bore(s) 9 provided in a flat plate 10 at the top of the spool lower weldment 1. As discussed above, the flat plate 8 on the bottom of the spool lower weldment 1 is generally rectangular in shape with triangular ear portions extending from both sides and optionally from the front. These triangular ear extensions are provided with through bores 9 that are configured to receive a locking pin 6. The flat plate 8 of the spool upper weldment 5 includes a single triangular extension on an inner side (opposite from which side the spool assembly extends) which has a through bore 7 therein. When the single through bore 7 in the flat plate 8 of the spool upper weldment 5 is aligned with any of the through bores 9 in the flat plate 10 of the spool lower weldment 1 locking pin 6 can be inserted into the aligned through bores to secure the spool assemble 11 on either side of the MTRA for use or in front of the MTRA for transportation. As further noted above, the flat plate 10 of the spool lower weldment 1 and the flat plate 8 of the spool upper weldment 5 can each have other shapes as long as they have the through bores that are alignable so as to receive a locking pin to secure the spool assemble 11 on either side of the MTRA for use or in front of the MTRA for transportation.

As shown in FIGS. 1 and 2 the spool upper weldment 5 has a lower horizontal portion 12 that has a sufficient length to position the spool assembly 11 off to either side of the MTRA so as to aligned with a length of temporary tape to be removed and wound on the spool assembly 11. The spool upper weldment 5 includes a shorter vertical portion 13 at the end of the lower horizontal portion 12 that supports a coupler body 14 that supports and couples a hydraulic drive motor 15 to a spool drive shaft 16 of the spool assembly 11.

The hydraulic motor 15 is provided with quick hydraulic line couplers (not shown) on an end opposed to the spool assembly 11. The use of quick hydraulic line couplers allows an operator to uncouple the hydraulic lines that operate the hydraulic motor, remove locking pin 6 and rotate the spool upper weldment 5 about turn table 4 with respect to the spool lower weldment 1. As can be appreciated, a single operator can thus position the spool assembly 11 as desired without assistance from another or others. Here it is noted that during use, a significant weight of used temporary tape can be collected and wound on the spool assembly 11 which would, absent the roller arm assembly of the present invention, would make it extremely difficult for one person to change the position of the spool assembly 11.

The hydraulic motor 15 is coupled vis the coupler body 14 to the spool drive shaft 16. The spool drive shaft 16 supports a disposable core or tape removal hub 17 which is positioned between a spool inner guide 18 and a spool outer guide 19. During a temporary tape removal operation, spool assembly 11 is rotated by hydraulic motor 15 and used tape is removed from a pavement surface and wound on disposable core or tape removal hub 17. Disposable core or tape removal hub 17 can be position on spool drive shaft 16 and removed with used tape wound thereon by removing clamp handle 20 that is threadedly attached to a thread end of spool drive shaft 16, and removing spool outer guide 19.

Figure 3:
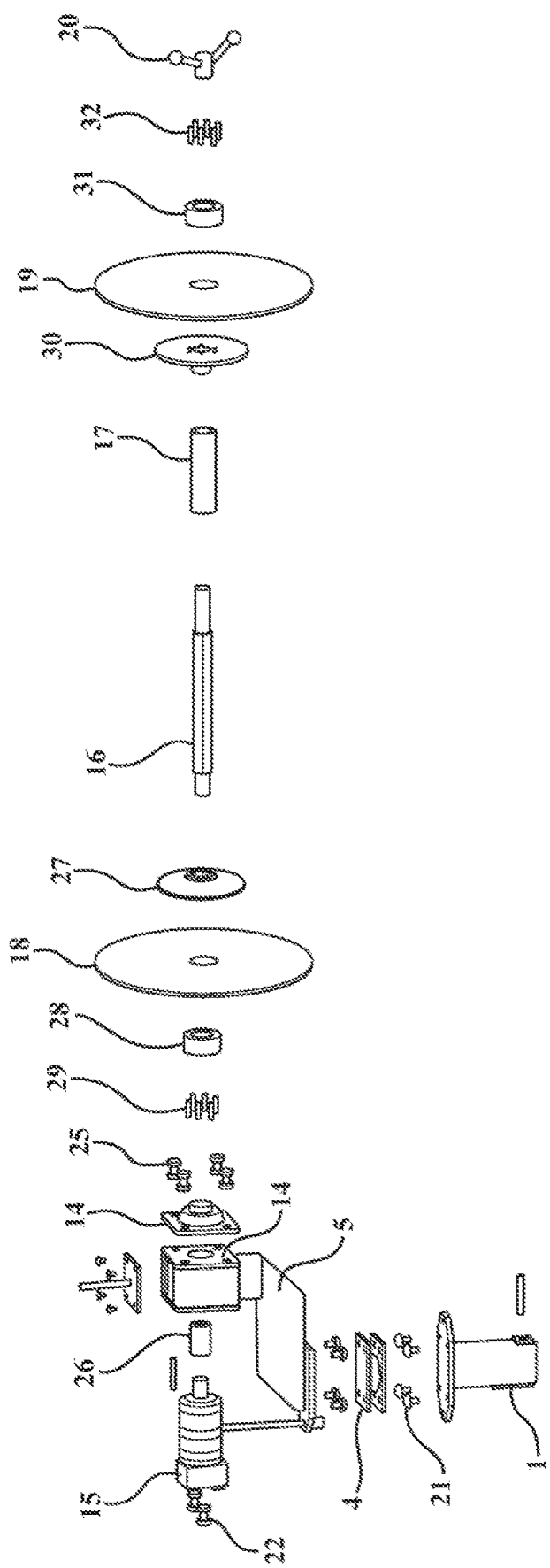
FIG. 3 is an exploded view of the roller arm assembly of FIG. 1
Figure 6B:
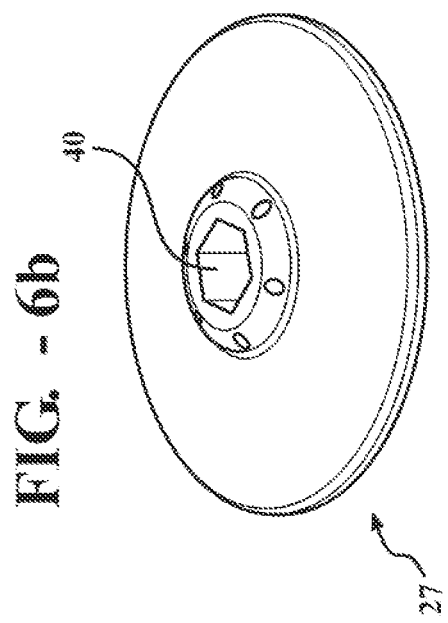
FIGS. 6a-6d are cross-sectional, perspective top, perspective side and side views of the spool inner plate according to one embodiment of the present invention.
Figure 6D:
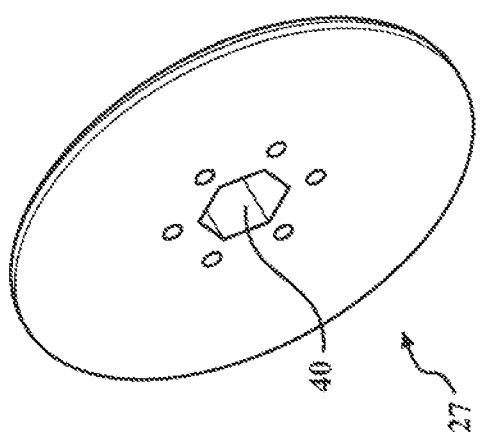
Figure 6A:
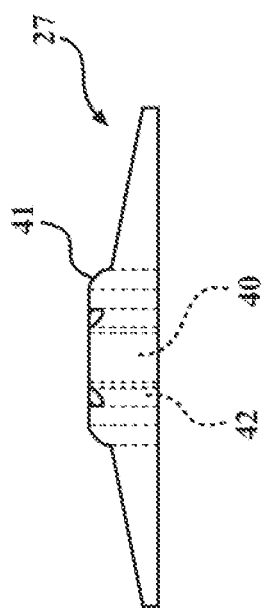
Figure 6C:
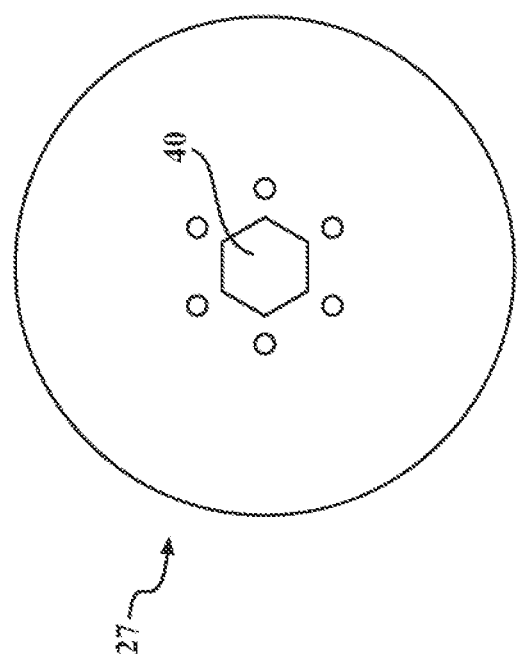

FIG. 3 is an exploded view of the roller arm assembly of FIG. 1. FIG. 3 depicts all the elements of the roller arm assembly and the manner in which they are assembled. As depicted, threaded fasteners such as bolts 21 can be used to secure the bottom of turn table 4 to the top of the spool lower weldment 1 and the top of turn table 4 to the bottom of spool upper weldment 5. Locking pin 6 can be a spring biased locking pin that is mounted to the flat plate 8 on the bottom of spool upper weldment 5, or a removable locking pin. Here is it noted that in the case of each locking pin associated with the turn table 4 and associated with the bracket used to pivotally attached the roller arm assembly to the front of a MTRA, either a non-biased removable pin could be used or a spring biased locking pin.

Hydraulic motor 15 is inserted into one side of coupler body 14 and secured in position by threaded fasteners such as bolts 22 that pass through a mounting flange 23 near the front of hydraulic motor 15 (see FIG. 1). A bearing 24 that allows spool drive shaft 16 to rotate is attached to the opposite side of coupler body 14 by threaded fasteners 25. Inside coupler body 14 a bore coupler 26 attaches to the shaft of hydraulic motor 15 and receives the inner end of spool drive shaft 16 in an opposite end.

The spool inner guide 18 has a spool inner plate 27 attached to one side and a spool bearing spacer 28 attached to the opposite side. The spool inner plate 27 and spool bearing spacer 28 are attached to the spool inner guide 18 by threader fasteners, such as bolts 29 that extend through spool bearing spacer 28 and spool inner guide 18 and are receiver in threaded bores provide in spool inner plate 27.

In a similar matter spool outer guide 19 has a spool outer plate 30 attached to one side and a spool outer spacer 31 attached to the opposite side. The spool outer plate 30 and spool outer spacer 31 are attached to the spool outer guide 19 by threader fasteners, such as bolts 32 that extend through spool outer spacer 31 and spool inner guide 19 and are receiver in threaded bores provide in spool outer plate 30.

The spool assembly 11 is developed by sliding the spool inner guard 18 (with the spool bearing spacer 28 and spool inner plate 27 attached thereto) onto the spool drive shaft 16. Next a disposable core or tape removal hub 17 is slide onto the spool drive shaft 16. Next the spool outer guide 19 (with the spool outer spacer 31 and spool outer plate 30 attached thereto) is slid onto the spool drive shaft 16. Finally clamp handle 20 is threaded onto a threaded end of spool drive shaft 16 and tightened to hold the spool assembly 11 together. As discussed below, the spool drive shaft 16 has a hexagon or other non-circular cross-sectional shape along the length of the spool drive shaft 16 except for the threaded end that is provided to receive the clamp handle 20 and a keyway end that is provided to engage bore coupler 26. Each of the spool bearing spacer 28, spool inner guide 18, spool inner plate 27, disposable core or tape removal hub 17, spool outer plate 30, spool outer guide 19 and spool outer spacer 31 each have central through bores that are complementary shaped to the hexagon (or other non-circular) cross-sectional shape of the spool drive shaft 16 so as to rotate and not slip from rotating with the spool drive shaft 16.

U.S. non-provisional patent application Ser. No. 16/657,706, entitled "TEMPORARY TAPE REMOVAL HUB FOR TAPE REMOVAL MACHINE," filed by the present inventor is expressly incorporated herein as describing a tape removal hub which can be use in conjunction with the roller arm assembly of the present invention.

FIGS. 4a-4e are perspective, top, front, and side views, respectively, of the spool lower weldment according to one embodiment of the present invention.

The spool lower weldment 1 includes a tubular body 33 which is shown as having a rectangular cross-sectional shape, it being understood that the tubular body 33 could have other cross-sectional shapes. At the bottom of the tubular body 33 aligned through holes 2 are provided in opposite sides of the tubular body 33 and are configured to pivotally attach the spool lower weldment 1 to the mounting or attachment bracket provided on the front of a MTRA as discussed above. A separate, single through bore 3 is provided in one side of the tubular body 33 and configured to receive a locking pin as discussed above to lock the roller arm assembly in an upright position as attached to a MTRA. The through bores 2 and 3 can further be provided in reinforcing plates 34 and 35 that are attached to the sides of the tubular body 33.

The flat plate 10 provided on the top of the spool lower weldment 1 is shown as having a general rectangular shape with triangle projections on either end with through bores 9 in the triangular projections. These through bores 9 are used to secure the spool upper weldment 5 in a desired position as discussed herein. The four threaded bores 36 in the top of the flat plate 10 are provided and configured to receive threaded fasteners 21 that are used to secure the bottom of turn table 4 to the top of flat plate 10.

FIGS. 5a-5e are perspective, top, front, and side views, respectively, of the spool upper weldment according to one embodiment of the present invention.

As discussed above, the spool upper weldment 5 includes a lower horizontal portion 12 which is a tubular part, and a shorter vertical portion 13 which is a tubular part. A flat plate 8 is attached to the bottom of the spool upper weldment 5. The flat plate 8 includes four threaded bores 37 that are configured to receive threaded fasteners 21 that are used to secure the flat plate 8 to the top of turn table 4. The flat plate 8 has a generally rectangular shape with a triangular end portion that has a through bore 7 and a short tubular extension 38 for extending the through bore 7. As can be understood, the tubular extension 38 has a height that is slightly less that the height of the turn table 4. The short tubular extension 38 helps align the through bore 7 in flat plate 8 with the through bores 9 in flat plate 10 and adds mechanical strength to the assembly.

The coupler box 14 is provided the top of the short vertical portion 13 of the spool upper weldment 5. The portion of the couple box shown in FIGS. 5b-5d are the side ends through which the hydraulic motor 15 and spool drive shaft 16 are coupled together in the coupler box 14.

FIGS. 5f-5i are perspective, top, front, and side views, respectively, of the top enclosure of the spool upper weldment according to one embodiment of the present invention. FIGS. 5f-5i depict a U-shaped structure 39 which forms the bottom, front wall and back wall of the coupler box 14. The U-shaped structure 39 and side ends of the coupler box 14 are welded together to form the coupler box 14.

FIGS. 6a-6d are cross-sectional, perspective top, perspective side and side views, respectively, of the spool inner plate according to one embodiment of the present invention. As shown, the spool inner plate 27 has a through bore 40 in the center that is complementary shaped to the non-circular cross-sectional shaped portion of the spool drive shaft 16 (e.g., hexagonal). The side of the spool inner plate 27 that faces the spool inner guide 18 is flat. The opposite side of the spool inner plate 27 has a circular hub portion 41 that extends axially outward, The spool inner plate 27 has a radial thickness that increases from the peripheral edge to the circular hub portion 41. The circular hub portion 41 has a thickness that is sufficient to provide for thread bores 42 to be formed therein into which threaded fasteners or bolts 29 are received as discussed above to attach the spool bearing spacer 28 and inner plate 27 to the spool inner guide 18.

FIGS. 7a-7d are cross-sectional, perspective top, perspective side and side views of the spool outer plate according to one embodiment of the present invention. As shown the spool outer plate 30 has a through bore 43 in the center that is complementary shaped to the non-circular cross-sectional shaped portion of the spool drive shaft 16 (e.g., hexagonal). The side of the spool outer plate 30 that faces the spool outer guide 19 is flat. The opposite side of the spool outer plate 30 has a circular hub portion 44 that extends axially outward. The spool outer plate 30 and has a radial thickness that increases from the peripheral edge toward the hub portion 44. The circular hub portion 44 has a thickness that is sufficient to provide for thread bores 45 to be formed therein into which threaded fasteners or bolts 32 are received as discussed above that are used to secure the spool outer spacer 31 and spool outer plate 30 to the spool outer guide 19. In the embodiment of the spool outer plate 30 shown in FIGS. 7a-7d, the central hub 44 has is axially longer than the central hub 41 in FIGS. 6a-6d for purposes of allowing the central hub 44 of spool outer plate 30 to be received into an end of a disposable core of tape removal hub 17 of the type disclosed and discussed in the present inventor U.S. nonprovisional patent application Ser. No. 16/657,706, which is expressly incorporated herein by reference.

Figure 8A:
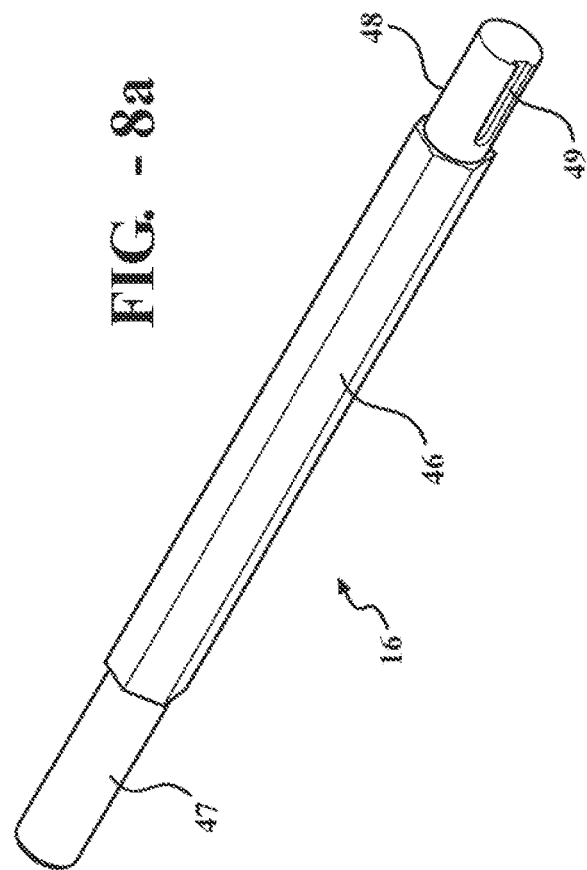
FIGS. 8a-8c are perspective, side, and end views of the spool drive shaft according to one embodiment of the present invention.
Figure 8C:
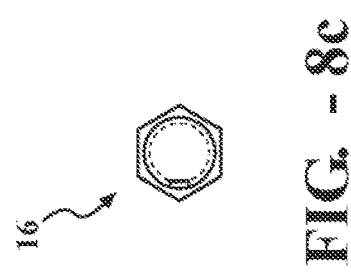
Figure 8B:
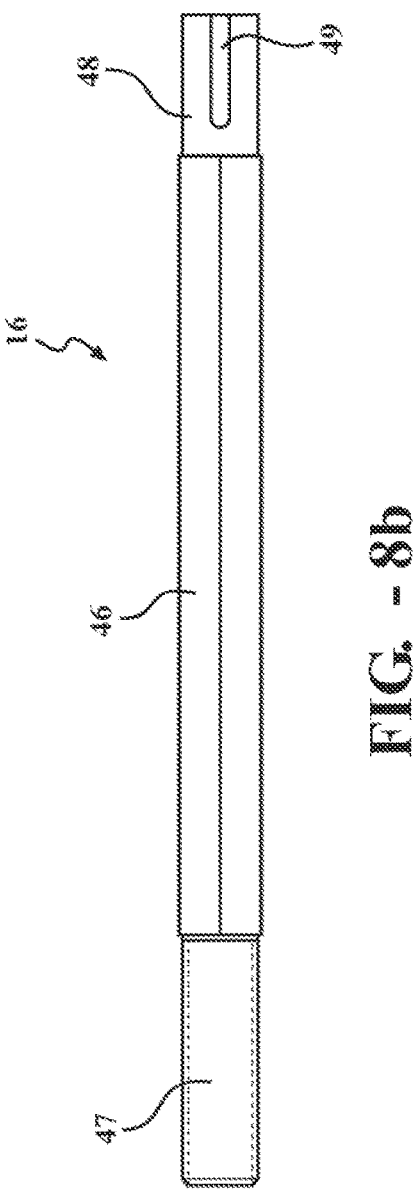

FIGS. 8a-8c are perspective, side, and end views, respectively, of the spool drive shaft according to one embodiment of the present invention. As shown, the central portion 46 of the spool drive shaft 16 has a hexagon cross-sectional shape as discussed above, and a threaded outer end 47 that is configured to receive the clamp handle 20 as discussed above. The inner end 48 of the spool drive shaft 16 has a round cross sectional shape that is configured to be received in bore coupler 26 and includes a keyway 49 that can engage or be engaged within the bore coupler 29 to rotate with the shaft of the hydraulic motor 15

Figure 9:
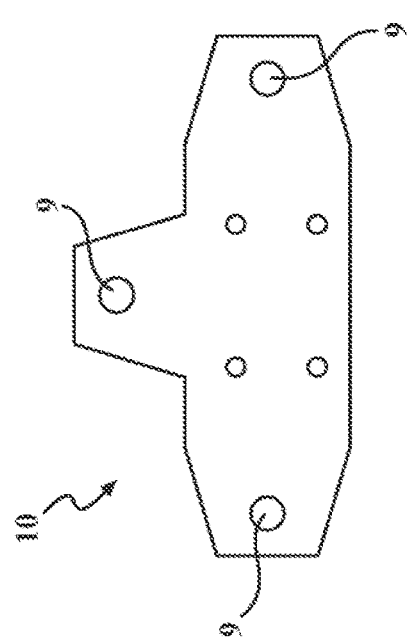
FIG. 9 is a top view of an alternative embodiment of the spool lower weldment.

FIG. 9 is a top view of an alternative embodiment of the spool lower weldment. In FIG. 9 the flat plate 10 on the top of the spool lower weldment 1 is shown as having a generally rectangular in shape with triangular ear portions or extensions extending from the sides and from the front. These triangular ear portions or extensions are provided with through bores 9 that are configured to receive a locking pin 6 discussed above. As noted above, the flat plate 10 on the top of the spool lower weldment 1 can have other shapes as long as the flat plate 10 includes through bores that are alignable so as to receive a locking pin to secure the spool assemble on either side of the MTRA for use or in front of the MTRA for transportation.

During a tape removing process the roller arm assembly is adjusted so that the spool assembly is on a desired side of a MTRA by pulling spring biased locking pin 6 outward and rotating the spool upper weldment 5 about turn table 4 and releasing spring biased locking pin 6 to secure the spool upper weldment in a desired position. Next a disposable core or tape removal hub 17 is secured on the spool drive shaft 16 and secured in position by removing and reattaching clamp handle 20 and outer spool guide 19 (with the spool outer spacer 31 and spool outer plate 30 attached thereto).

As used tape is removed from a pavement and wound on spool assembly 11 (while rotating spool assembly 11) the removed tape in guided onto disposable core or tape removal hub 17 by spool inner and outer guides 18 and 19.

After a tape removal process the clamp handle 20 is removed from the threaded end 47 of spool drive shaft 16 and the outer spool guide 19 (with the spool outer spacer 31 and spool outer plate 30 attached thereto) is removed to access the disposable core or tape removal hub 17 having the removed tape wound thereon.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A vehicle for removing temporary tape that comprises a chassis having fixed and guiding wheels, a drive means on said chassis for moving said vehicle, a spool assembly including a rotatable spool assembly for winding used temporary tape thereon, a spool assembly support mounted to the chassis and supporting the spool assembly above the chassis, and controllable drive means to rotate the rotatable spool, the improvement wherein the spool assembly support comprises:
    a lower arm portion having a top and being attached to the chassis, said lower arm portion having a flat plate extending across the top thereof; and
    an upper arm portion having a bottom and a flat plate extending across the bottom, said upper arm being rotatably attached to a top of the lower arm portion and extending upwardly from the top of the lower arm portion, said spool assembly coupled to the top of the upper arm assembly,
    wherein the upper arm portion is configured to allow the spool assembly to be positioned on either side of the chassis when the upper arm is rotated with respect to the lower arm portion.

2. A vehicle according to claim 1, wherein the flat plate at the top of the lower arm portion is attached to a bottom of a turn table and the flat plate at the bottom of the upper arm portion is attached to a top of the turn table.

3. A vehicle according to claim 2, further comprising a locking pin that is insertable between the lower arm portion and the upper arm portion to lock the position of the upper arm portion with respect to the lower arm portion.

4. A vehicle according to claim 1, wherein the lower arm portion is pivotally connected to the chassis.

5. A vehicle according to claim 4, wherein the lower arm is pivotable between a raised and a lowered position.

6. A vehicle according to claim 4, wherein the lower arm can be locked in the raised position.

7. A vehicle according to claim 1, wherein the upper arm portion includes a horizontal portion that is long enough to position the spool assembly on either side of the chassis.

8. A vehicle according to claim 7, wherein the upper arm portion further includes a vertical portion that extend upward from an end of the horizontal portion.

9. A vehicle according to claim 1, wherein the controllable drive means comprises a hydraulic motor.

10. A vehicle according to claim 1, wherein the spool assembly comprises a drive shaft that has a non-circular shaped cross-sectional length.

11. A vehicle according to claim 10, wherein a free end of the drive shaft includes a threaded portion.

12. A vehicle according to claim 10, further comprising a coupler box provided on a top of the upper arm portion.

13. A vehicle according to claim 12, wherein the spool assembly includes a drive shaft and the means to rotate the rotatable spool and drive shaft are coupled together within the coupler box.

14. A vehicle according to claim 1, wherein the spool assembly includes an inner guide and an outer guide that are spaced apart by a disposable core or tape removal hub.

15. A vehicle according to claim 14, wherein the spool assembly comprises a drive shaft that has a non-circular shaped cross-sectional length and the inner and outer guides have complementary shaped non-circular center bores.

16. A vehicle according to claim 14, further an inner plate attached to the inner guide and an outer plate attached to the outer guide.

17. A vehicle according to claim 16, wherein the outer plate comprises an axially extending center hub that is configured to be received in a disposable core or tape removal hub.

\* \* \* \* \*